United States Patent [19]

Ippolito

[11] Patent Number: 5,593,231
[45] Date of Patent: Jan. 14, 1997

[54] HYDRODYNAMIC BEARING

[75] Inventor: Rodolfo M. Ippolito, Colleyville, Tex.

[73] Assignee: Dresser Industries, Inc., Dallas, Tex.

[21] Appl. No.: 373,086

[22] Filed: Jan. 17, 1995

[51] Int. Cl.$^6$ .......................... F16C 17/02; F16C 43/02; E21B 10/24
[52] U.S. Cl. .................... 384/114; 384/95; 384/124; 29/898.02
[58] Field of Search .................. 384/92, 93, 95, 384/100, 103, 104, 114, 117, 118, 119, 124, 302, 309, 312; 125/337, 359, 371; 29/898.02, 898.07

[56] References Cited

U.S. PATENT DOCUMENTS

| | | | |
|---|---|---|---|
| 1,731,790 | 10/1929 | Payne | 29/898.058 |
| 3,096,835 | 7/1963 | Neilson | 384/94 |
| 3,167,361 | 1/1965 | Snapp et al. | 384/97 |
| 3,199,878 | 8/1965 | Cunningham et al. | 277/88 |
| 3,235,316 | 2/1966 | Whanger | 384/95 |
| 3,515,449 | 6/1970 | Harbage, Jr. | 384/97 |
| 3,549,215 | 12/1970 | Hollingsworth | 384/117 |
| 3,601,459 | 8/1971 | Cutting | 384/100 |
| 3,656,764 | 4/1972 | Robinson | 277/92 |
| 3,717,393 | 2/1973 | Linda et al. | 384/119 |
| 3,944,306 | 3/1976 | Neilson | 384/94 |
| 4,059,318 | 11/1977 | Hollingsworth | 384/117 |
| 4,400,099 | 8/1983 | Ehrentraut | 384/283 |
| 4,499,642 | 2/1985 | Vezirian et al. | 384/95 X |
| 4,561,787 | 12/1985 | Ehrentraut et al. | 384/295 |
| 4,569,601 | 2/1986 | Ippolito | 384/95 |
| 4,718,155 | 1/1988 | Warriner et al. | 29/898.12 |
| 4,726,695 | 2/1988 | Showalter | 384/121 |
| 4,787,129 | 11/1988 | Williamson | 29/898.059 |
| 4,875,532 | 10/1989 | Langford, Jr. | 175/371 |
| 4,927,275 | 5/1990 | Lawson | 384/117 |
| 5,035,519 | 7/1991 | Aizawa et al. | 384/124 X |
| 5,054,938 | 10/1991 | Ide | 384/117 |
| 5,112,143 | 5/1992 | Ide | 384/117 |

FOREIGN PATENT DOCUMENTS

| | | | |
|---|---|---|---|
| 1132266 | 10/1956 | France . | |
| 1691605 | 11/1991 | U.S.S.R. | 384/114 |
| 528709 | 11/1940 | United Kingdom . | |
| 1517160 | 7/1978 | United Kingdom | 384/119 |

*Primary Examiner*—Thomas R. Hannon
*Attorney, Agent, or Firm*—Baker & Botts, L.L.P.

[57] ABSTRACT

A hydrodynamic bearing (16) for a cutter cone assembly (12) that rotates around a journal (14). The bearing (16) comprises a plurality of grooves (88) on an outer surface (90) to produce undulations (82) on an inner surface (84) upon insertion of the bearing (16) into a bearing recess (94). Undulations (82) act as pockets to collect lubricant which is forced upon rotation of the bearing (16) between the outer journal surface (86) and the inner bearing surface (84) to produce a hydrodynamic film.

44 Claims, 3 Drawing Sheets

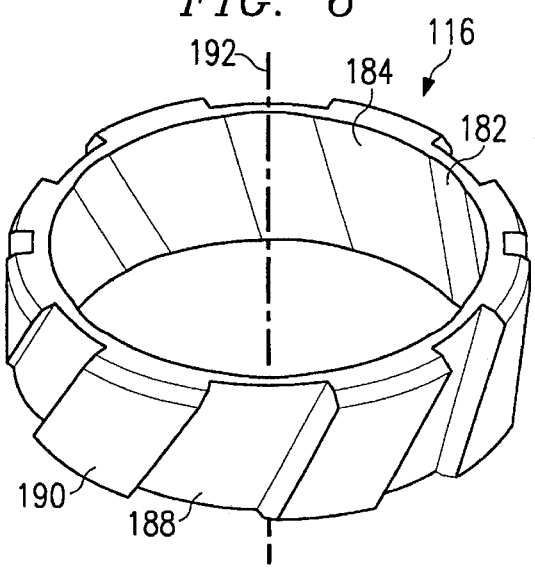
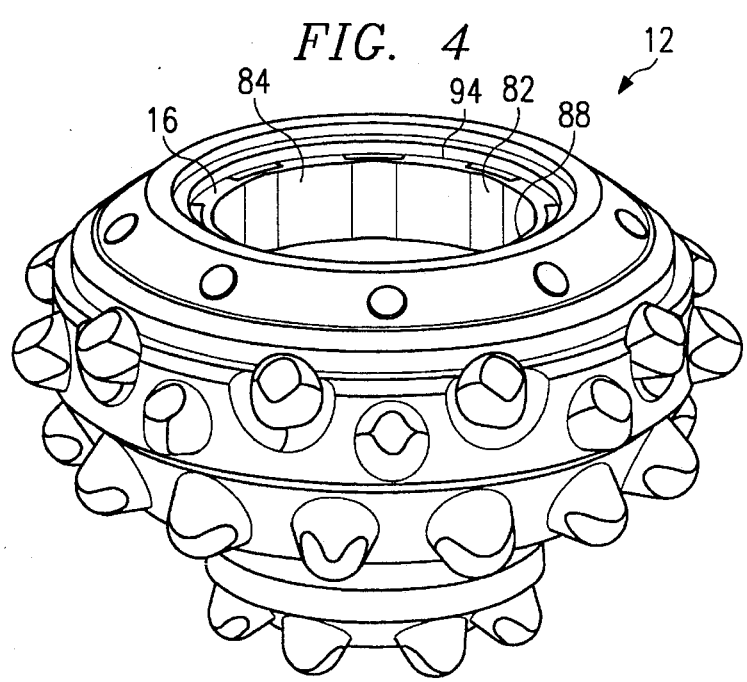
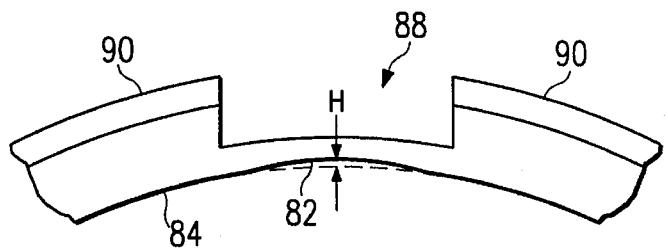
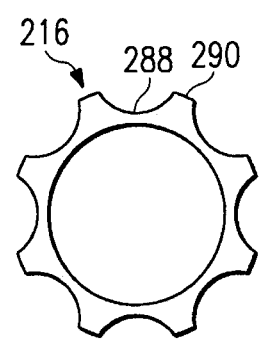
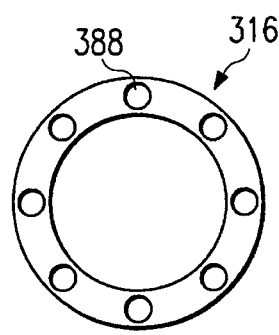
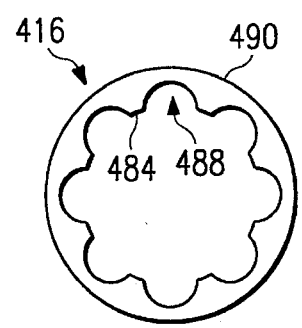

HYDRODYNAMIC BEARING

TECHNICAL FIELD OF THE INVENTION

This invention relates in general to the field of bearings and in particular to a hydrodynamic bearing for use with, for example, a rotary cone drill bit.

BACKGROUND OF THE INVENTION

Various types of rotary drill bits or rock bits may be used to form a bore hole in the earth. Examples of such rock bits include roller cone bits or rotary cone bits used in drilling oil and gas wells. A typical roller cone bit comprises a bit body with an upper end adapted for connection to a drill string. A plurality of support arms, typically three, depend from the lower end portion of the bit body with each arm having a journal protruding radially inward and downward with respect to a projected rotational axis of the bit body.

Conventional roller cone bits are typically constructed in three segments. The segments may be positioned together longitudinally with a welding groove between each segment. The segments may then be welded with each other using conventional techniques to form the bit body. Each segment also includes an associated support arm extending from the bit body. An enlarged cavity or passageway is typically formed in the bit body to receive drilling fluids from the drill string. U.S. Pat. No. 4,054,772 entitled, *Positioning System for Rock Bit Welding* shows a method and apparatus for constructing a three cone rotary rock bit from three individual segments. U.S. Pat. No. 4,054,772 is incorporated by reference for all purposes within this application.

A cutter cone is generally mounted on each journal and supported rotatably on bearings acting between the journal and the inside of a journal receiving cavity in the cutter cone. Typically, the bearings are spaced from the journal by a diametral distance on the order of 0.007 inches. In a sealed roller cone bit, a lubricant under pressure is forced into the space between the journal and the bearings. A lubricant reservoir is used to compensate for any partial grease loss and to balance the internal lubricant pressure to the external hydrostatic pressure during the drilling operation. The lubricant may comprise, for example, a calcium complex grease. Additionally, solids, such as molybdenum disulfide, may be added to the lubricant to increase the load-carrying capacity of the bearings.

The bearings in a roller cone rock bit are heavily loaded during downhole drilling operations. In such drilling operations, the roller cone rock bit is rotated in a bore hole which causes the cutter cones to rotate on the journals. The roller cone rock bit typically operates at a low speed with heavy weight applied to the bit which also produces a high load on the associated bearings. This makes it difficult to generate a lubricant film between the surfaces of the bearing and the journal. If the lubricant film is too thin, the surfaces may come in contact causing additional friction and heat which can ultimately cause failure of the drill bit. For example, the drill bit may comprise one or more elastomeric seals which may be degraded by exposure to high temperatures created by excessive friction. This may allow water, mud, and other debris from the drilling operation to penetrate the space between the roller cone and the journal and thus increase the wear on the bearing surfaces to the point where the roller cones are lost in the hole.

Some prior bearings have been designed to compensate for the difficulty in generating a sufficient lubricant film. For example, U.S. Pat. No. 4,787,129 entitled METAL OF MANUFACTURING A COMPOSITE JOURNAL BUSHING discloses a bearing that incorporates a thin layer of a metal such as silver. The silver layer on the bearing surface acts as a solid lubricant. However, the addition of this layer is difficult and expensive.

SUMMARY OF THE INVENTION

In accordance with the present invention, a hydrodynamic bearing is provided that substantially reduces or eliminates problems and disadvantages with prior bearings.

According to one aspect, the present invention provides a journal bearing for a rotating body that rotates around a journal. The journal bearing comprises a bearing body that has a longitudinal axis and an opening approximately concentric with the axis for receiving the journal. The bearing body also has an outer surface in which a plurality of relief grooves are formed. Finally, the bearing body has an uninterrupted inner bearing surface that has a plurality of undulations. The undulations are formed opposite the relief grooves when the bearing body is pressed into the rotating body. The undulations partially define pockets for collecting lubricant to produce a hydrodynamic film between the bearing surface and the journal. The pockets provide the additional benefit of acting as traps for wear debris.

According to another aspect of the present invention, the placement and structure of the relief grooves on the exterior of the bearing body may be varied. For example, the relief grooves may be oriented parallel to a longitudinal axis of the bearing body. Alternatively, the grooves may be oriented at an acute angle with respect to the longitudinal axis of the bearing body so as to allow the resulting undulations on the interior of the bearing body to force lubricant flow in a predetermined direction. The number, width and depth of the relief grooves may similarly be varied.

Technical advantages of the present invention include incorporating undulations on an uninterrupted, inner surface of a bearing body to promote the formation of a hydrodynamic film in a low speed, high load operation which reduces friction and wear on the bearing. The undulations provide areas or pockets which are filled with lubricant. As the bearing rotates, the wedges, formed by the undulations, force lubricant between the bearing and journal surfaces and thus form a thick lubricant film that separates the bearing surfaces. The inner surface of the bearing body is relatively uninterrupted and continuous in that the undulations are formed without leaving sharp edges on the inner surface that could damage the journal or cause the bearing body to malfunction. Therefore, the undulations allow the formation of a hydrodynamic film and do not cause weaknesses or malfunctions in the bearing body.

Another technical advantage of the present invention includes that it provides a hydrodynamic bearing having undulations formed on an inner surface without the necessity of a complicated machining process. A plurality of grooves are formed in an exterior surface of the bearing body. Undulations are formed on the interior surface when the bearing body is pressed into the cutter cone. Appropriately sized and oriented undulations may be formed on the interior surface of the bearing body without requiring strict tolerances on the depth of the grooves in the outer surface of the bearing body. Such outer grooves may be quickly and economically machined into the bearing body. Alternatively, the grooves may be formed as part of the forging or molding process for forming the bearing body.

BRIEF DESCRIPTION OF THE DRAWINGS

For a more complete understanding of the present invention, and the advantages thereof, reference is now made to the following description taken in conjunction with the accompanying drawings in which like reference numbers indicate like features and wherein:

FIG. 4 is an isometric view of a cutter cone having a hydrodynamic bearing of FIG. 3 pressed therein according to the teachings of the present invention;

FIG. 5 is an enlarged portion of the bearing of FIG. 3 which illustrates the undulations in the interior surface of the bearing;

FIG. 6 is an isometric view of another embodiment of a hydrodynamic bearing constructed according to the teachings of the present invention; and FIGS. 7a–7c are top views of other embodiments of the hydrodynamic bearing constructed according to the teachings of the present invention.

DETAILED DESCRIPTION OF THE INVENTION

Figure 1:
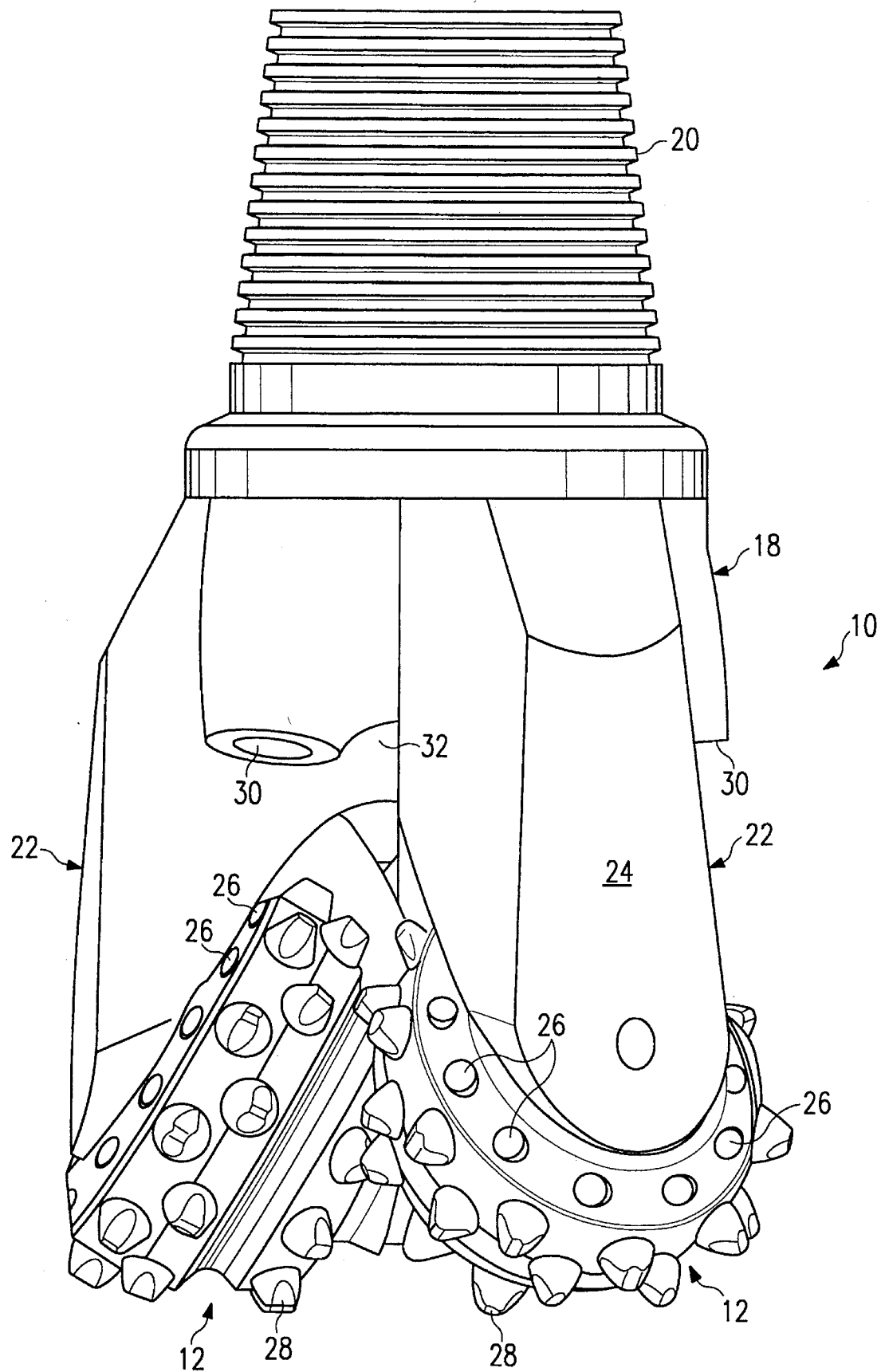
FIG. 1 is an isometric view of a rotary cone drill bit constructed according to the teachings of the present invention.

FIGS. 1 through 7 illustrate various aspects of a rotary cone drill bit, indicated generally at 10, of the type used in drilling a bore hole in the earth. Drill bit 10 may also be referred to as a "roller cone rock bit" or "rotary rock bit." With rotary cone drill bit 10, cutting action occurs as cone-shaped cutters, indicated generally at 12, are rolled around the bottom of the bore hole (not shown) by the rotation of a drill string (not shown) attached to bit 10. Cutters 12 may also be referred to as "rotary cone cutters", "roller cone cutters" or "cutter cone assemblies". Each cutter 12 will rotate on journal 14 with its associated bearing 16 disposed therebetween. It should be understood that the teachings of the present invention are not limited to rotary cone drill bits. Bearing 16 may be used in other appropriate devices in which one body rotates around another body.

Rotary cone drill bit 10 comprises an enlarged body 18 having a tapered, externally spread upper portion 20 that is adapted to be secured to the lower end of the drill string. Depending from body 18 are three support arms 22 (two visible in FIG. 1). Each arm support 22 comprises a cutter cone assembly 12 rotatably mounted on one end. As shown in FIG. 2, each support arm 22 includes a journal 14 formed integral to the support arm 22. Journals 14 are preferably angled downwardly and inwardly with respect to enlarged body 18 and exterior surface 24 of the associated support arm 22 so that as bit 10 is rotated, cutter cone assemblies 12 engage the bottom of the bore hole. For some applications, journals 14 may also be tilted at an angle of zero to three or four degrees in the direction of rotation of bit 10.

Cutter cone assemblies 12 each may include pressed inserts 26 on the gage surface and protruding inserts 28 or milled teeth, both of which scrape and gouge against the sides and bottom of the bore hole under the down-hole force supplied through the drill string. The formation of bore hole debris thus created is carried away from the bottom of the bore hole by a drilling fluid ejected from nozzle 30 on underside 32 of bit 10. The drilling fluid then flows upwardly toward the surface through an annulus (not shown) formed between bit 10 and the side wall (not shown) of the bore hole. Each of the three cutter cones assemblies 12 is generally constructed and mounted on its associated journal 14 in a substantially identical manner. Accordingly, only one support arm 22 and cutter cone assembly 12 is described in detail. It should be understood that such description also applies to the other support arms 22 and cutter cones assemblies 12.

Figure 2:
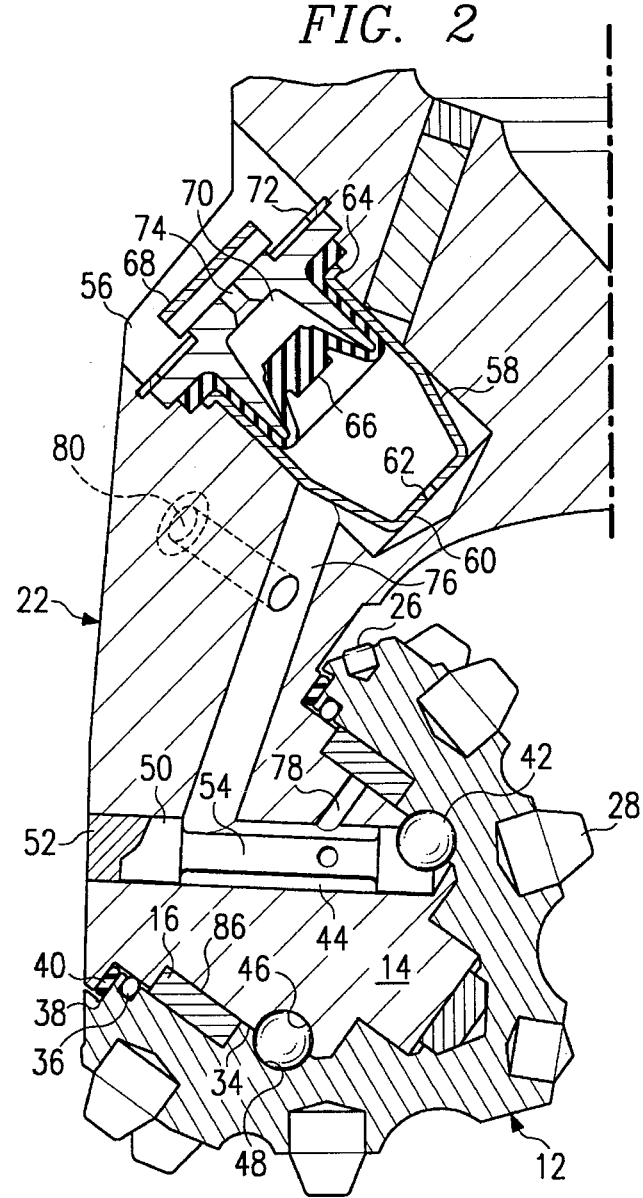
FIG. 2 is a cross-sectional view with portions broken away of a cutter cone assembly incorporating a hydrodynamic bearing according to the teachings of the present invention.

FIG. 2 is a cross-sectional view of a support arm, indicated generally at 22, of FIG. 1. Cutter cone 12 has a generally cylindrical internal cavity 34 for receiving journal 14. Bearing 16 is pressed in cutter cone 12 such that cutter cone 12 may rotate about journal 14. Various aspects of several embodiments of bearing 16 are described below with respect of FIGS. 3 through 7.

An elastomer seal 36 is located at the mouth of internal cavity 34 to provide a seal between internal cavity 34 and journal 14. Elastomer seal 36 may comprise, for example, an O-ring or a similar elastomer ring seal forming a fluid-tight seal. This provides a sealed-bearing assembly for cutter cone 12 mounted on journal 14. Journal 14 and cutter cone 12 form a seal gland 38 outward from elastomer seal 36. A flat elastomer seal 40 is located in seal gland 38 outwardly from elastomer seal 36 as shown. Flat seal 40 provides an additional fluid barrier between cutter cone 12 and journal 14.

Cutter cone 12 is retained on journal 14 by a plurality of ball bearings 42 inserted through a ball passage 44 in journal 14. Ball bearings 42 reside in an annular array within cooperatively associated ball races 46 and 48 in journal 14 and cutter cone 12, respectively. Once inserted, ball bearings 42 prevent the disengagement of cutter cone 12 from journal 14. Ball passage 44 subsequently is plugged with a ball plug 50 welded at 52 into ball passage 44. Ball plug 50 provides a necked down intermediate portion 54.

Roller cone rock bit 10 includes a lubricant cavity 56 that is open to the outside surface of bit 10 (not shown in FIG. 1). Lubricant cavity 56 houses a main lubricant reservoir. The main lubricant reservoir comprises a generally cylindrical lubricant container 58 disposed within lubricant cavity 56. Lubricant container 58 has a closed end 60 having a lubricant opening 62. The opposite open end of lubricant container 58 has a flanged shoulder 64 supporting a flexible resilient diaphragm 66 that closes lubricant container 58. A cap 68 covers diaphragm 66 and defines a chamber 70 facing diaphragm 66 to provide a volume into which diaphragm 66 can expand. Cap 68, diaphragm 66 and lubricant container 58 are retained within lubricant cavity 56 by a snap ring 72. Cap 68 also includes an opening 74 for placing the outer face of diaphragm 66 in fluid communication with external fluids surrounding roller cone rock bit 10. The volume between diaphragm 66 and lubricant container 58 may be filled with a suitable lubricant to define a source of lubricant for bearing 16 and ball bearings 42 of roller cone rock bit 10.

A lubricant passage 76 is drilled through support arm 22 to place lubricant cavity 56 in fluid communication with ball passage 44. Lubricant passage 76 is drilled from an end of lubricant cavity 56 generally adjacent lubricant opening 62 and lubricant container 58. Ball passage 44 is placed in fluid communication with internal cavity 34 by conduit 78. Upon assembly of roller cone rock bit 10, lubricant passage 76, lubricant container 58, lubricant cavity 56, the available space in the ball plug passage 44, conduit 78 and the available space in internal cavity 34 are filled with lubricant through an opening 80 in arm 22. Opening 80 is subsequently sealed after lubricant filling.

The pressure of the external fluids outside roller cone rock bit 10 may be transmitted to the lubricant in lubricant container 58 through diaphragm 66. The flexing of diaphragm 66 maintains the lubricant at a pressure generally equal to the pressure of the external fluids outside roller cone rock bit 10. This pressure is transmitted through lubricant passage 76, ball passage 44, conduit 78 and internal cavity 34 to the inward face of elastomer seal 36 exposing elastomer seal 36 to an internal pressure from the lubricant generally equal to the pressure of the external fluids. Flat seal 40 operates as a barrier to external fluids and debris to protect the integrity of elastomer seal 36.

Figure 3:
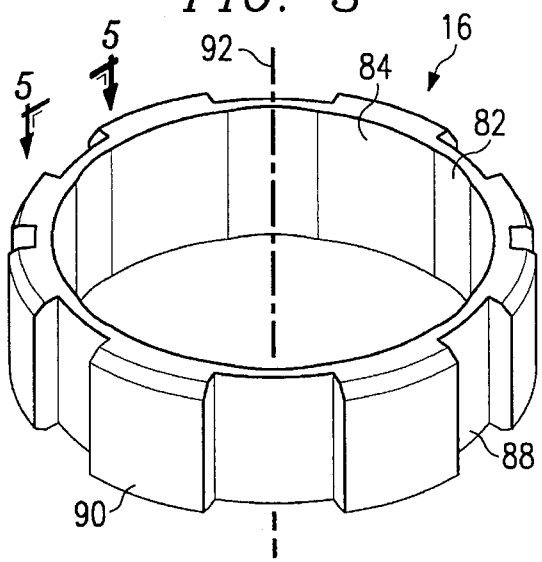
FIG. 3 is an isometric view of a hydrodynamic bearing constructed according to the teachings of the present invention.

FIGS. 3 through 5 illustrate an embodiment of a bearing 16 constructed according to the teachings of the present invention for use with cutter cone assembly 12. It is a technical advantage of the present invention that bearing 16 may provide a hydrodynamic film that reduces contact between journal 14 and bearing 16. Bearing 16 comprises a plurality of undulations 82 in an inner surface 84. It is noted that undulations 82 are shown in bearing 16 in FIGS. 3, 4 and 5. As described, these undulations are not formed until bearing 16 is pressed into cutter cone 12. However, undulations 82 are shown in bearing 16 in FIGS. 3 and 5 without cutter cone 12 only for convenience in describing this aspect of the invention. Undulations 82 provide pockets for collecting lubricant. As bearing 16 rotates around journal 14, undulations 82 act as ramps to wedge lubricant, trapped in the pockets, between outer surface 86 of journal 14 and inner surface 84 of bearing 16. This action provides the technical advantage of increasing the lubricant pressure between surfaces 84 and 86 thereby creating a thicker lubricant film and separating surfaces 84 and 86 to reduce friction and heat.

The manner in which undulations 82 are formed provides an inner surface 84 that is substantially uninterrupted or continuous. This reduces the risk of damage to journal 14 when compared to prior methods that create a hydrodynamic effect through the use of interrupted surfaces or machined grooves which may expose sharp edges to sliding contact with journal 14. First, a plurality of grooves 88 are formed in an outer surface 90 of bearing 16. Grooves 88 may be oriented parallel to a longitudinal axis 92 of bearing 16. Alternatively, grooves 188 may be formed at an acute angle with respect to longitudinal axis 192 of bearing 116 as shown in FIG. 6 so as to direct lubricant in a particular direction such as toward elastomer seal 36. The orientation of grooves 88 may be chosen so as to control the orientation of undulations 82.

Grooves 88 may be formed in outer surface 90 of bearing 16 in several different ways. First, grooves 88 may be machined in outer surface 90. Alternatively, grooves 88 may be preformed in bearing 16. Depending on the type of material being used for bearing 16, grooves 88 may be forged into bearing 16 or grooves 88 may be molded into bearing 16 if a powder metallurgy process is used. It is noted that grooves 88 also provide an additional reservoir which increases the amount of lubricant present in the area of bearing 16.

As shown in FIG. 3 through 5, bearing 16 comprises eight grooves 88 that have a depth approximately two-thirds of the thickness of bearing 16. It should be understood that the number of grooves 88 and their depth may be varied without departing from the spirit and scope of the invention. For example, a particular bearing may comprise from three to eight grooves 88. The number of grooves may be increased or decreased based, for example, on the size of bearing 16. Additionally, the depth of grooves 88 may be varied to control the height H in FIG. 5 of undulations 82. Grooves 88 may, for example, be formed to have a depth of between one-half and three-quarters of the thickness of bearing 16. It is a technical advantage of the present invention that undulations 82 are not formed by machining undulations directly in inner surface 84 of bearing 16. Machining or forming grooves 88 in outer surface 90 is accomplished more quickly and economically without requiring adherence to strict tolerances as would be required on inner surface 84.

As shown in FIG. 4, bearing 16 is pressed into a bearing recess 94 of cutter cone 12 to form undulations 82 in inner surface 84. The compression of bearing 16 in bearing recess 94 causes undulations 82 to form opposite grooves 88 as best shown in FIG. 5. Undulations 82 are a direct result of the compressive stresses to which bearing 16 is subjected when pressed with interference fit into bearing recess 94 of cutter cone 12. The amount of interference between outer surface 90 of bearing 16 and bearing recess 94 of cutter cone 12 can be used to control the height H of undulations 82. However, it is preferable to use a fixed interference fit in a minimum amount of 0.001 inch per inch of outside diameter of bearing 16 and to vary the depth of grooves 88 in order to produce the desired height H for undulations 82. The height H of undulations 82 should preferably be in the range of 0.0002 to 0.002 inch or a maximum of 0.001 inch per inch of outside diameter of bearing 16.

FIGS. 7a through 7c are top views of other embodiments of bearing 16 constructed according to the teachings of the present invention. For example, in FIG. 7a, bearing 216 comprises rounded grooves 288 that are spaced apart around a diameter of bearing 216 in outer surface 290. Alternatively, as shown in FIG. 7b, grooves 88 may be replaced with subsurface axial holes 388. Finally, as shown in FIG. 7c, grooves 488 may be formed in inner surface 484 of bearing 416. In this manner, bearing 416 is mounted with interference fit at inner surface 484 over a receiving journal which may rotate or remain stationary. In this embodiment, the undulations will form on outer surface 490 of bearing 416.

Although the present invention and its advantages have been described in detail, it should be understood that various changes, substitutions and alterations can be made therein without departing from the spirit and scope of the invention as defined by the appended claims. For example, inner surface 84 of bearing 16 may be lined with a thin coating of silver or other appropriate solid lubricant or combination of solid lubricants prior to or after insertion in bearing recess 94. Additionally, the depth of relief grooves 88 may be varied outside the range of one-half to three-quarters of the thickness of bearing 16 depending on the interference fit between surfaces 90 and 94 and the thickness of bearing 16. For example, if the thickness of bearing 16 is large and the interference fit is small, grooves 88 may have a depth of more than three-quarters of the thickness of bearing 16. Alternatively, if the interference is large and the thickness is small, grooves 88 may have a depth of less than one-half of the thickness of bearing 16.

What is claimed is:

1. A journal bearing for a rotating body, comprising:

a bearing body having an uninterrupted bearing surface, a longitudinal axis and an opening concentric with said axis for receiving a journal; and means disposed in said bearing body for creating undulations in said uninterrupted bearing surface due to the compressive stresses acting on said bearing body when said bearing body is pressed into position for rotation such that said undulations provide pockets for collecting lubricant to produce a hydrodynamic film on said bearing surface.

2. The bearing of claim 1, wherein said rotating body comprises a cutter cone for a rotary cone drill bit, said cutter cone having a bearing recess into which said bearing body is pressed, said undulations formed due to the compressive stresses between said bearing body and said cutter cone bearing recess.

3. The bearing of claim 1, wherein said bearing surface comprises an outer diameter surface of said bearing body.

4. The bearing of claim 1, wherein said bearing surface comprises an inner diameter surface of said bearing body.

5. The bearing of claim 1, wherein said undulation means comprises subsurface axial holes spaced apart around a diameter of said bearing body so as to produce undulations on said bearing surface opposite said axial holes.

6. The bearing of claim 1, wherein said undulation means comprises grooves formed in a surface opposite said bearing surface as to produce undulations on said bearing surface opposite said grooves.

7. The bearing of claim 6, wherein said grooves are machined in said surface.

8. The bearing of claim 6, wherein said grooves are preformed in said surface opposite said bearing surface prior to any machining or finishing operation of said bearing body.

9. The bearing of claim 6, wherein said grooves are formed in said surface opposite said bearing surface by a mold used to produce said bearing body.

10. The bearing of claim 6, wherein said bearing body comprises between three and eight grooves formed in said surface opposite said bearing surface.

11. The bearing of claim 6, wherein a depth of each groove is between one-half and three-quarters of a thickness of said bearing body.

12. The bearing of claim 6, wherein said grooves are parallel to said longitudinal axis.

13. The bearing of claim 6, wherein said bearing body is substantially annular in shape.

14. The bearing of claim 6, wherein the peak-to-valley height of said undulations is between 0.0002 and 0.002 inches.

15. The bearing of claim 6, wherein the peak-to-valley height of at least one undulation varies from the peak-to-valley height of at least one other undulation.

16. The bearing of claim 6, wherein said grooves are formed at a predetermined acute angle with respect said longitudinal axis.

17. A journal bearing for a rotating body, comprising:

a bearing body having an uninterrupted bearing surface, a longitudinal axis and an opening concentric with said axis for receiving a journal; and means disposed in said bearing body for creating undulations in said uninterrupted bearing surface when said bearing body is pressed into position for rotation such that said undulations provide pockets for collecting lubricant to produce a hydrodynamic film on said bearing surface, wherein said undulation means comprises grooves formed in a surface opposite said bearing surface as to produce undulations on said bearing surface opposite said grooves and wherein the peak-to-valley height of said undulations is between 0.0002 and 0.002 inches.

18. A journal bearing for a rotating body, comprising:

a bearing body having an uninterrupted bearing surface, a longitudinal axis and an opening concentric with said axis for receiving a journal; and means disposed in said bearing body for creating undulations in said uninterrupted bearing surface when said bearing body is pressed into position for rotation such that said undulations provide pockets for collecting lubricant to produce a hydrodynamic film on said bearing surface, wherein said undulation means comprises grooves formed in a surface opposite said bearing surface as to produce undulations on said bearing surface opposite said grooves and wherein the peak-to-valley height of at least one undulation varies from the peak-to-valley height of at least one other undulation.

19. A journal bearing for a rotating body, comprising:

a bearing body having an uninterrupted bearing surface, a longitudinal axis and an opening concentric with said axis for receiving a journal; and means disposed in said bearing body for creating undulations in said uninterrupted bearing surface when said bearing body is pressed into position for rotation such that said undulations provide pockets for collecting lubricant to produce a hydrodynamic film on said bearing surface, wherein said undulation means comprises grooves formed in a surface opposite said bearing surface as to produce undulations on said bearing surface opposite said grooves and wherein said grooves are formed at a predetermined acute angle with respect said longitudinal axis.

20. A rotary cone drill bit for forming a bore hole, comprising:

a bit body having an upper portion adapted for connection to a drill string for rotation of said drill bit;

said bit body having a longitudinal axis corresponding approximately with the projected axis of rotation of said drill bit;

a number of support arms attached to said bit body and extending opposite from said upper portion, each of said support arms having an inside surface with a journal connected thereto, each journal projecting generally downwardly and inwardly with respect to its associated support arm;

each of said support arms having a longitudinal axis extending substantially parallel with the longitudinal axis of said bit body;

a number of cutter cone assemblies mounted respectively to one of said journals, each said cutter cone assembly comprising a bearing recess;

a number of journal bearings with each of said journal bearings having a bearing body with a longitudinal axis, a plurality of grooves formed in an outer surface of said bearing body, and an uninterrupted inner bearing surface having undulations opposite the grooves formed due to the compressive stresses acting on said bearing body when the bearing body is pressed into the bearing recess of an associated cutter cone assembly, said undulations providing pockets for collecting lubricant to produce upon rotation a hydrodynamic film between said inner bearing surface and said journal.

21. The rotary cone drill bit of claim 20, wherein said grooves are machined in said outer surfaces of said journal bearings.

22. The rotary cone drill bit of claim 20, wherein said grooves are preformed in said outer surfaces of said journal bearings prior to any machining or finishing operation of said bearing bodies.

23. The rotary cone drill bit of claim 20, wherein said grooves are formed in said outer surfaces of said journal bearings by a mold used to produce said bearing bodies.

24. The rotary cone drill bit of claim 20, wherein said bearing body comprises between three and eight grooves formed in said outer surfaces of said journal bearings.

25. The rotary cone drill bit of claim 20, wherein each groove comprises a depth between one-half and three-quarters of a thickness of said bearing bodies.

26. The rotary cone drill bit on claim 20, wherein said bearing bodies are substantially annular in shape.

27. The rotary cone drill bit of claim 20, wherein said grooves are parallel to said bearing body longitudinal axis.

28. The rotary cone drill bit of claim 20, wherein the peak-to-valley height of said undulations is between 0.0002 and 0.002 inches.

29. The rotary cone drill bit of claim 20, wherein the peak-to-valley height of at least one undulation varies from the peak-to-valley height of at least one other undulation.

30. The rotary cone drill bit of claim 20, wherein said grooves are formed at a predetermined acute angle with respect said bearing body longitudinal axis.

31. A rotary cone drill bit for forming a bore hole, comprising:

a bit body having an upper portion adapted for connection to a drill string for rotation of said drill bit;

said bit body having a longitudinal axis corresponding approximately with the projected axis of rotation of said drill bit;

a number of support arms attached to said bit body and extending opposite from said upper portion, each of said support arms having an inside surface with a journal connected thereto, each journal projecting generally downwardly and inwardly with respect to its associated support arm;

each of said support arms having a longitudinal axis extending substantially parallel with the longitudinal axis of said bit body;

a number of cutter cone assemblies mounted respectively to one of said journals, each said cutter cone assembly comprising a bearing recess;

a number of journal bearings with each of said journal bearings having a bearing body with a longitudinal axis, a plurality of grooves formed in an outer surface of said bearing body, and an uninterrupted inner bearing surface having undulations opposite the grooves formed when the bearing body is pressed into the bearing recess of an associated cutter cone assembly, said undulations providing pockets for collecting lubricant to produce upon rotation a hydrodynamic film between said inner bearing surface and said journal, wherein the peak-to-valley height of said undulations is between 0.0002 and 0.002 inches.

32. A rotary cone drill bit for forming a bore hole, comprising:

a bit body having an upper portion adapted for connection to a drill string for rotation of said drill bit;

said bit body having a longitudinal axis corresponding approximately with the projected axis of rotation of said drill bit;

a number of support arms attached to said bit body and extending opposite from said upper portion, each of said support arms having an inside surface with a journal connected thereto, each journal projecting generally downwardly and inwardly with respect to its associated support arm;

each of said support arms having a longitudinal axis extending substantially parallel with the longitudinal axis of said bit body;

a number of cutter cone assemblies mounted respectively to one of said journals, each said cutter cone assembly comprising a bearing recess;

a number of journal bearings with each of said journal bearings having a bearing body with a longitudinal axis, a plurality of grooves formed in an outer surface of said bearing body, and an uninterrupted inner bearing surface having undulations opposite the grooves formed when the bearing body is pressed into the bearing recess of an associated cutter cone assembly, said undulations providing pockets for collecting lubricant to produce upon rotation a hydrodynamic film between said inner bearing surface and said journal, wherein the peak-to-valley height of at least one undulation varies from the peak-to-valley height of at least one other undulation.

33. A rotary cone drill bit for forming a bore hole, comprising:

a bit body having an upper portion adapted for connection to a drill string for rotation of said drill bit;

said bit body having a longitudinal axis corresponding approximately with the protected axis of rotation of said drill bit;

a number of support arms attached to said bit body and extending opposite from said upper portion, each of said support arms having an inside surface with a journal connected thereto, each journal projecting generally downwardly and inwardly with respect to its associated support arm;

each of said support arms having a longitudinal axis extending substantially parallel with the longitudinal axis of said bit body;

a number of cutter cone assemblies mounted respectively to one of said journals, each said cutter cone assembly comprising a bearing recess;

a number of journal bearings with each of said iournai bearings having a bearing body with a longitudinal axis, a plurality of grooves formed in an outer surface of said bearing body, and an uninterrupted inner bearing surface having undulations opposite the grooves formed when the bearing body is pressed into the bearing recess of an associated cutter cone assembly, said undulations providing pockets for collecting lubricant to produce upon rotation a hydrodynamic film between said inner bearing surface and said journal, wherein said grooves are formed at a predetermined acute angle with respect said bearing body longitudinal axis.

34. A method for forming a hydrodynamic film between a bearing body and a journal, said method comprising the steps of:

forming a bearing having an annular body with a central axis, a plurality of grooves formed in an outer surface of the annular body and an uninterrupted inner bearing surface;

pressing the bearing into a bearing recess of a rotating body to form undulations in the inner surface of the annular body opposite the grooves;

placing the rotating body with the bearing body over the journal;

securing the rotating body in place on the journal;

supplying lubricant between the bearing body and the journal body; and rotating the rotating body on the journal such that the undulations wedge lubricant between the bearing body and the journal to produce a hydrodynamic film.

35. The method of claim 34, and further comprising the step of machining the plurality of grooves in the outer surface of the annular body.

36. The method of claim 34, and further comprising the step of orienting the grooves so as to be parallel to the longitudinal axis of the annular body.

37. The method of claim 34, and further comprising the step of orienting the grooves so as to be formed at an acute angle with respect to the central axis of the annular body.

38. The method of claim 34, wherein said step of forming an annular body comprises the step of forming an annular body in a mold that produces a plurality of grooves in the outer surface of the annular body.

39. The method of claim 34, and further comprising the step of forming a plurality of grooves having a depth of between one-half and three-quarters of the thickness of the annular body.

40. The method of claim 34, wherein said step of forming a bearing body comprises the step of forming a bearing body having between three and eight grooves formed in an outer surface thereof.

41. The method of claim 34, wherein said step of forming a bearing body comprises the step of forming a bearing body having a peak-to-valley height of said undulations between 0.0002 and 0.002 inches.

42. The method of claim 34, wherein said step of forming a bearing body comprises the step of forming a bearing body with at least one undulation having a peak-to-valley height that varies from the peak-to-valley height of at least one other undulation.

43. A rotary cone drill bit for forming a bore hole, comprising:

a one piece bit body having an upper portion adapted for connection to a drill string for rotation of said drill bit;

said bit body having a longitudinal axis corresponding approximately with the projected axis of rotation of said drill bit;

a number of support arms attached to said bit body and extending opposite from said upper portion, each of said support arms having an inside surface with a journal connected thereto, each journal projecting downwardly and inwardly with respect to its associated support arm;

each of said support arms having a longitudinal axis extending substantially parallel with longitudinal axis of said bit body;

a number of cutter cone assemblies mounted respectively on one of said journals, each said cutter cone assembly comprising a bearing recess; and a number of journal bearings, each journal bearing comprising:

a beating body having an inner surface, and outer surface, a central axis, and an opening centered on said central axis for receiving one of said journals;

a plurality of relief grooves formed parallel to said central axis having a depth between one-half and three-quarters of the thickness of said bearing body, said grooves formed in said outer surface of said bearing body; and said inner surface comprising an uninterrupted inner bearing surface having undulations opposite said grooves formed due to the compressive stresses acting on said bearing body when the bearing body is pressed into one of said cutter cones such that said undulations provide pockets for collecting lubricant which is forced upon rotation of said bearing body between journal and bearing surfaces to produce a hydrodynamic film between said surfaces.

44. A rotary cone drill bit for forming a bore hole, comprising:

a one piece bit body having an upper portion adapted for connection to a drill string for rotation of said drill bit;

said bit body having a longitudinal axis corresponding approximately with the protected axis of rotation of said drill bit;

a number of support arms attached to said bit body and extending opposite from said upper portion, each of said support arms having an inside surface with a journal connected thereto, each journal projecting downwardly and inwardly with respect to its associated support arm;

each of said support arms having a longitudinal axis extending substantially parallel with longitudinal axis of said bit body;

a number of cutter cone assemblies mounted respectively on one of said journals, each said cutter cone assembly comprising a bearing recess; and a number of journal bearings, each journal bearings comprising:

a bearing body having an inner surface, and outer surface, a central axis, and an opening centered on said central axis for receiving one of said journals;

a plurality of relief grooves formed parallel to said central axis having a depth between one-half and three-quarters of the thickness of said bearings body, said grooves formed in said outer surface of said bearing body; and said inner surface comprising an uninterrupted inner bearing surface having undulations opposite said grooves formed when the bearing body is pressed into one of said cutter cones such that said undulations provide pockets for collecting lubricant which is forced upon rotation of said bearing body between journal and bearing surfaces to produce a hydrodynamic film between said surfaces wherein the peak-to-valley height of said undulations is between 0.0002 and 0.002 inches.

* * * * *